(12) United States Patent  
Kuroda et al.

(10) Patent No.: US 6,703,967 B1  
(45) Date of Patent: Mar. 9, 2004

(54) DISTANCE MEASURING DEVICE

(75) Inventors: Hiroshi Kuroda, Hitachi (JP); Kazuaki Takano, Mito (JP); Mitsuru Nakamura, Hitachinaka (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 10/069,593

(22) PCT Filed: Jan. 28, 2000

(86) PCT No.: PCT/JP00/00464

§ 371 (c)(1),  
(2), (4) Date: Feb. 27, 2002

(87) PCT Pub. No.: WO01/55745

PCT Pub. Date: Aug. 2, 2001

(51) Int. Cl.$^7$ .............................................. G01S 13/38
(52) U.S. Cl. ....................... 342/111; 342/70; 342/112; 342/116; 342/129
(58) Field of Search ................. 342/111, 112, 342/116, 129, 130, 107, 70

(56) References Cited

U.S. PATENT DOCUMENTS

| | | | |
|---|---|---|---|
| 3,750,172 A | * 7/1973 | Tresselt | 342/129 |
| 4,851,851 A | * 7/1989 | Hane | 342/112 |
| 5,285,207 A | * 2/1994 | Asbury et al. | 342/129 |
| 5,646,623 A | * 7/1997 | Walters et al. | 342/129 |
| RE36,095 E | * 2/1999 | Urabe et al. | 342/133 |
| 5,923,284 A | 7/1999 | Artis et al. | 342/129 |
| 6,023,238 A | * 2/2000 | Cornic et al. | 342/129 |
| 6,434,506 B1 | * 8/2002 | Eckersten et al. | 702/142 |

FOREIGN PATENT DOCUMENTS

| | | |
|---|---|---|
| GB | 2 249 448 A | 5/1992 |
| JP | 8-262130 | 10/1996 |
| JP | 9-152477 | 6/1997 |
| JP | 10-197626 | 7/1998 |
| JP | 11-133143 | 5/1999 |

OTHER PUBLICATIONS

"Trend of Development of millimeter–wave radar for Vehicles", Journal of the Institute of Electronics, Information and Communication Engineers, pp977–981, Oct. 1996.
"About Distances Measurement Processing for Stepped FM Code Radar", Transactions A of the Institute of Electronics, Information and Communication Engineers, vol. 1, J81–A, No. 4, pp 490–495, Apr. 1998.
International Search Report and translation of pertinent portions thereof.

* cited by examiner

Primary Examiner—Thomas H. Tarcza  
Assistant Examiner—Isam Alsomiri (57) ABSTRACT

From a transmitter (18) and a transmission antenna (10), a first frequency signal having a fixed frequency is transmitted for a predetermined time or more, a second frequency signal having a certain frequency difference from the first frequency signal is transmitted for a predetermined time or more, and a third frequency signal having a frequency difference twice the frequency distance from the first frequency signal is transmitted for a predetermined time or more. Reflected waves from objects under measurement at the respective transmission frequencies are supplied to a reception antenna (11), a mixer (12), an analog circuit unit (13), an A/D converter (14), an FFT (15) and a signal processing unit (16). Then, the Doppler frequencies are measured for the reflected waves, objects under measurement are separated and detected at each Doppler frequency, and objects under measurements having the same Doppler frequency are separated to identify a plurality of objects under measurement from phase information and amplitude information of received signals acquired at each transmission frequency. In this manner, when there are a plurality of objects under measurement which are substantially equal in relative speed, these can be separated from each other and detected.

7 Claims, 9 Drawing Sheets

Prior Art

FIG.11B

Prior Art

FIG.11C

Prior Art

DISTANCE MEASURING DEVICE

TECHNICAL FIELD

The present invention relates to a distance measuring apparatus which radiates a radio wave, receives reflected light from an object under measurement, and detects the object to detect the distance to the object and a relative speed.

BACKGROUND ART

As an example of the distance measuring apparatus, there is a distance measuring apparatus for an automotive vehicle. This distance measuring apparatus for an automotive vehicle radiates a radio wave to receive a reflected wave from a target such as a car, an obstacle or the like, and detects a propagation time of the radio wave, the magnitude of the reflected wave, a Doppler shift of the frequency, and the like to measure the distance to the target and a relative speed from the result.

Several methods are known for measurements of the distance to a target, and a relative speed. For example, a variety of methods have been described in "Trend of Development of millimeter-wave radar for Vehicles," Journal of the Institute of Electronics, Information and Communication Engineers, pp977–981, October 1996.

Also, known radar methods include a two-frequency CW (Continuous Wave) method which switches two frequencies, an FMCW (Frequency Modulated Continuous Wave) method which performs a triangular modulation on a transmission frequency, a pulse method which transmits a pulse wave to measure the distance from a turnaround time of the pulse wave.

Further, JP-A-11-133143, JP-A-9-152477 and the like describe methods of separating and detecting a plurality of targets in an FMCW-based radar apparatus.

Further, researches have been under progress for a method of measuring a distance by switching a transmission frequency in a step-wise manner, receiving a reflected signal at each transmission frequency, and performing an inverse Fourier transform on these signals to derive time axis information, for example, as described in "About Distance Measurement Processing for Stepped FM Code Radar," Transactions A of the Institute of Electronics, Information and Communication Engineers, Vol. 1, J81-A, No. 4, pp-490–495, April 1998.

Now, referring to FIG. 11, the principles of the two-frequency CW method will be described for measuring a relative speed of a target, making use of a Doppler shift, and switching two frequencies to measure the distance to the target from phase information of received signals at the respective frequencies.

Figure 11A:
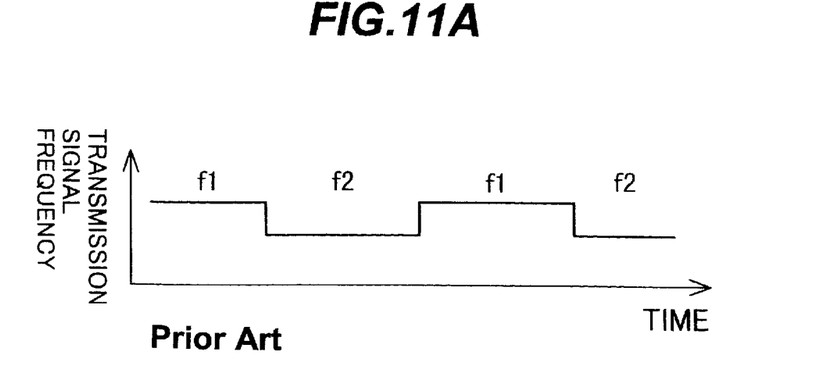
FIGS. 11A, 11B and 11C are is an explanatory diagram diagrams for an example of a conventional two-frequency CW method.
Figure 11B:
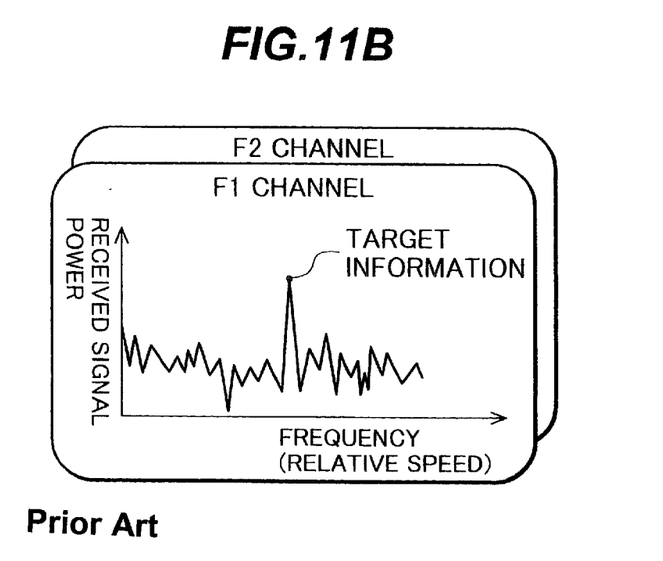
Figure 11C:
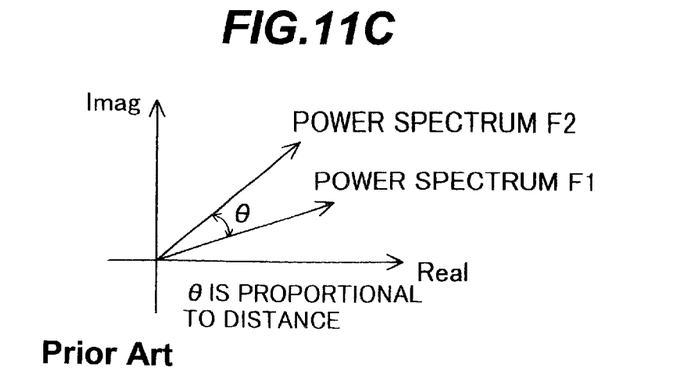

With the two-frequency CW method using a single transmitter, two frequencies F1 (f1), F2 (f2) are alternately transmitted over time, as shown in FIG. 11(A). In the prior art, the frequencies F1, F2 are switched over time at a period of approximately 100 KHz, and a difference f between the two frequencies F1, F2 is approximately 300 KHz.

Next, the reception side fast Fourier transforms received signals at the respective transmission frequencies F1, F2 to find the frequency spectrum of a received beat signal. An example of the measured received frequency spectrum is shown in FIG. 11(B). When a target exists, a signal indicative of the target appears in a region of a frequency (Doppler frequency), which corresponds to a relative speed exhibited by the target, on the frequency spectrum, as shown in FIG. 11(B).

The two-frequency CW method has the ability to provide information on the target for each of the two transmission frequencies F1, F2. The radar method utilizing the Doppler frequency like the two-frequency CW method is capable of separating and detecting a plurality of targets which differ in relative speed from one another from the information on the frequency spectrum derived in the foregoing manner.

Then, the relative speed is calculated for each of the separated and detected targets from the Doppler frequency. The information on the frequency spectra for two received signals in the two-frequency CW method maybe shown invector representation based on the phase and amplitude, as can be seen in FIG. 11(C). The difference of phase angle between the two power spectra F1, F2 is proportional to the distance to the target.

When the power spectra F1, F2 are represented in complex signals Signal(1), Signal(2), the relationship between the distance (Range) and the phase difference of the two frequency is expressed by the following Equation 1 from the fact that the difference f between the transmission frequencies F1, F2 is known:

$$\text{Range}=(c \cdot |\theta|)/(4\pi \cdot \Delta f) \qquad (1)$$

where $\Delta f = F2-F1$;

$\theta = \arg(\text{Signal}(1)) - \arg(\text{Signal}(2))$; and c is the velocity of light.

From the foregoing, the two-frequency CW method can calculate a relative speed with a target from the Doppler frequency, and can calculate the distance to the target from phase angle information.

DISCLOSURE OF THE INVENTION

However, distance measuring apparatuses utilizing the Doppler shift, as represented by the two-frequency CW method, separates and detects targets relying on the relative speed, so that such apparatuses experience difficulties in separating and detecting a plurality of targets having the same relative speed.

Therefore, for example, even if two obstacles actually exist, the apparatus may determine in some cases that only one obstacle exists.

It is an object of the present invention to provide a distance measuring apparatus which has a function of separating and detecting a plurality of targets, which are substantially equal in relative speed to one another, in a radar apparatus which utilizes the Doppler frequency.

To achieve the above object, the present invention is configured in the following manner.

(1) A distance measuring apparatus which radiates a radio wave, receives a reflected wave from an object under measurement, and detects the object under measurement, wherein the apparatus comprises transmitting means for continuously transmitting a first frequency signal for a predetermined time or more, continuously transmitting a second frequency signal having a predetermined frequency difference from the first frequency for a predetermined time or more, and transmitting a signal having a frequency difference of an integer multiple equal to or larger than twice the predetermined frequency difference from the first frequency over signals at N frequencies, where N is an integer equal to or larger than one, receiving means for measuring a Doppler frequency of the reflected wave from the object under measurement at each of the respective transmission frequencies of the first frequency signal, second frequency signal, and N frequency signals, and detection processing means for separating a plurality of objects under measurements to detect the respective objects.

(2) Preferably, in the foregoing (1), the N is one.

(3) Also, preferably, in the foregoing (1), (2), the detection processing means has a first separation/detection function for separating and detecting an object under measurement at each Doppler frequency of received signals, and a second separation/detection function for measuring phase information and amplitude information on received Doppler frequencies, and separating and detecting a plurality of object under measurements having substantially the same Doppler frequencies from the phase information and amplitude information.

(4) Also, preferably, in the foregoing (1), (2), (3), the transmitting means has a single transmitter, wherein a plurality of frequencies are periodically alternately transmitted by the single oscillator.

(5) A distance measuring apparatus which radiates a radio wave, receives a reflected wave from an object under measurement, and detects the object under measurement, wherein the apparatus comprises transmitting means for continuously transmitting a first frequency signal for a predetermined time or more, continuously transmitting a second frequency signal having a predetermined frequency difference from the first frequency for a predetermined time or more, and transmitting a signal having a frequency difference of an integer multiple equal to or larger than twice the predetermined frequency difference from the first frequency over signals at N frequencies, where N is an integer equal to or larger than one, the means having a first time region in which the first frequency signal and the second frequency signal are alternately transmitted over time, and a second time region in which the first frequency signal through (N+2)th frequency signal are respectively transmitted alternately over time, receiving means for measuring a Doppler frequency of the reflected wave from the object under measurement at each of the respective transmission frequencies of the first frequency, second frequency, and N frequencies, and detection processing means for separating a plurality of objects under measurement to detect the respective objects.

BEST MODE FOR CARRYING OUT THE INVENTION

In the following, embodiments of the present invention will be described with reference to FIGS. 1 through 10.

Figure 1:
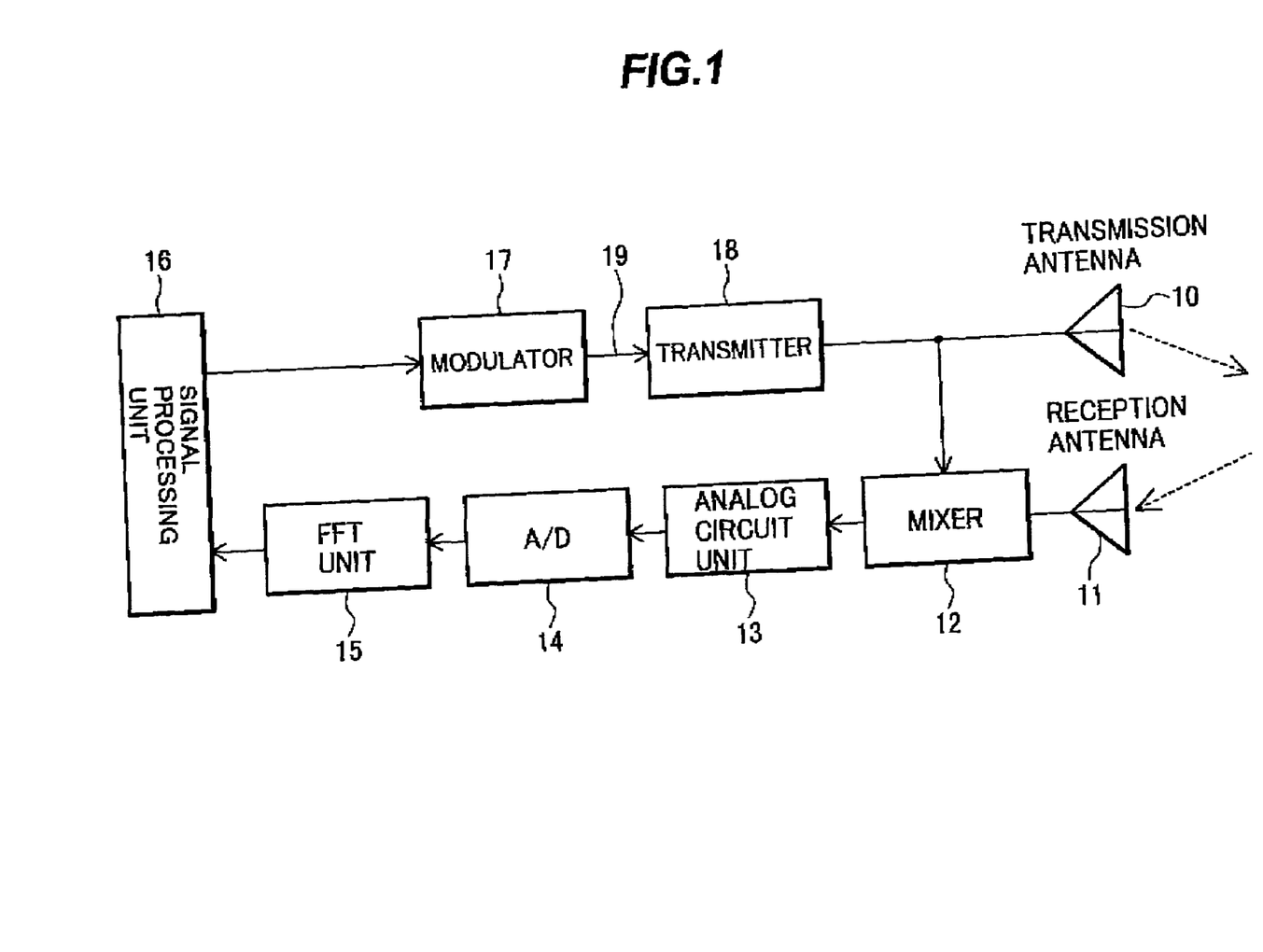
FIG. 1 is a block diagram of a radar apparatus (distance measuring apparatus) according to a first embodiment of the present invention.

FIG. 1 is a block diagram of a radar apparatus (distance measuring apparatus) according to a first embodiment of the present invention, which is an example in which the present invention is applied to a distance measuring apparatus for an automotive vehicle.

In FIG. 1, a transmitter 18 transmits at a transmission frequency based on a modulated signal 19 from a modulator 17, and a transmitted high frequency signal is radiated from a transmission antenna 10. In the distance measuring apparatus for an automotive vehicle, a radio wave signal in a millimeter-wave band is typically used as the high frequency signal.

A reception antenna 11 receives a radio wave signal reflected back from a target (object under measurement) such as a vehicle, an obstacle or the like, and a mixer 12 performs a frequency conversion. The mixer 12 is supplied with a portion of the output signal of the transmitter 18 through a directive coupler, so that a beat signal generated by mixing the signal from the transmitter 18 and the received signal from the reception antenna 11 is sent from the mixer 12 to an analog circuit unit 13.

In a radar system for measuring a relative speed and distance utilizing the Doppler frequency, the beat signal outputted from the mixer 12 is simply the Doppler frequency when using a homodyne-based reception system for directly converting to a baseband.

Then, the beat signal outputted from the mixer 12 is supplied from the analog circuit unit 13 to an A/D converter 14 which converts the beat signal to a digital signal that is then supplied to an FFT (fast Fourier transform) unit 15. This FFT unit 14 relies on a fast Fourier transform to measure the frequency spectrum of the beat signal as information of the amplitude and phase which is then sent to a signal processing unit 16.

Figure 2:
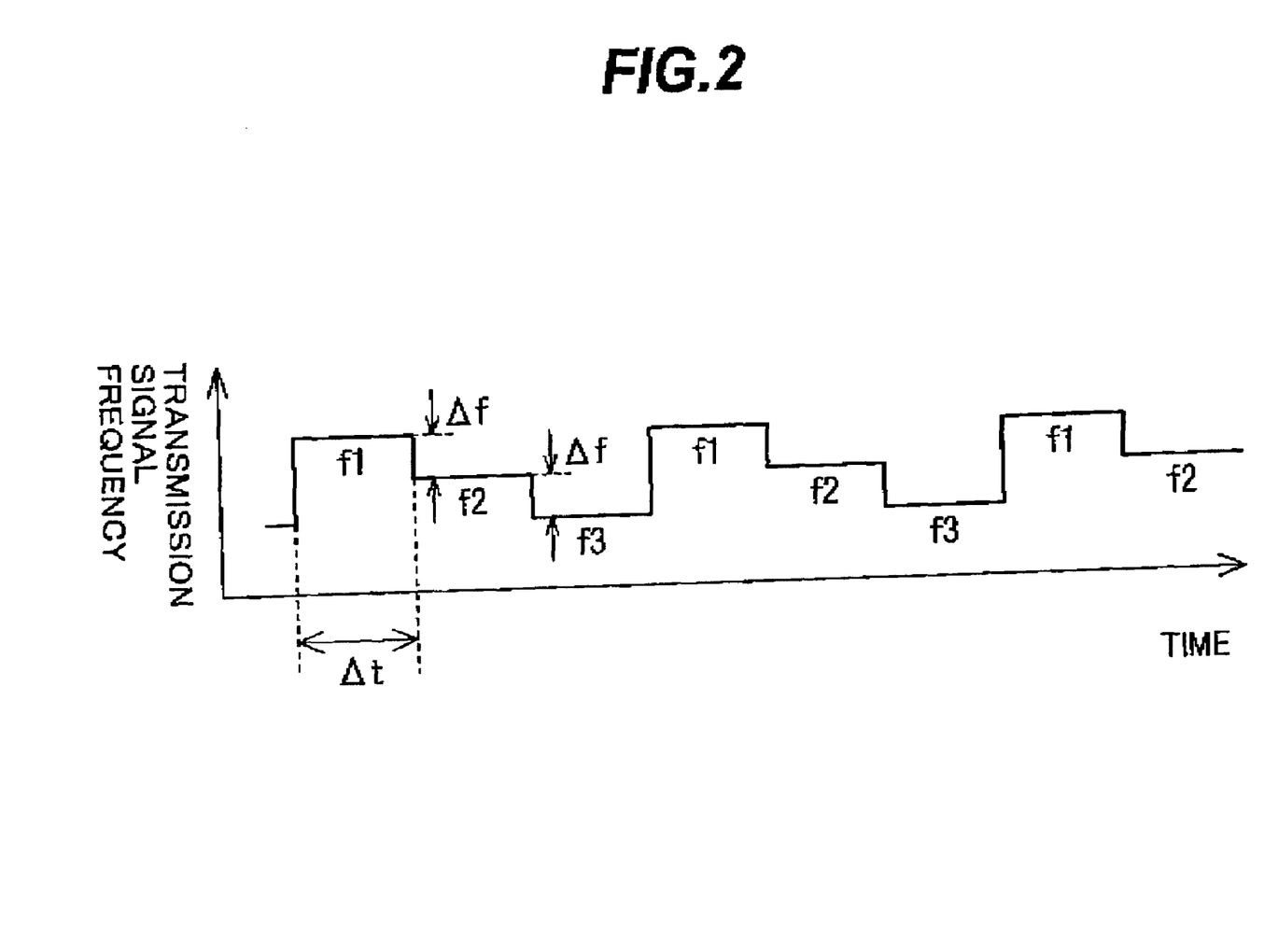
FIG. 2 is a diagram showing a change in a transmission signal over time in the first embodiment.

Next, FIG. 2 shows an exemplary transmission signal in the distance measuring apparatus according to the first embodiment of the present invention. The example shown in FIG. 2 represents a method of switching three transmission frequencies f1, f2, f3 over time. These three frequencies f1, f2, f3 are set such that differences between mutually adjacent frequencies (f1 and f2, f2 and f3) present the same difference value Δf.

As these three frequencies are alternately transmitted over time, received signals are measured at the respective frequencies to acquire information on the frequency spectra at the respective transmission frequencies.

Figure 3:
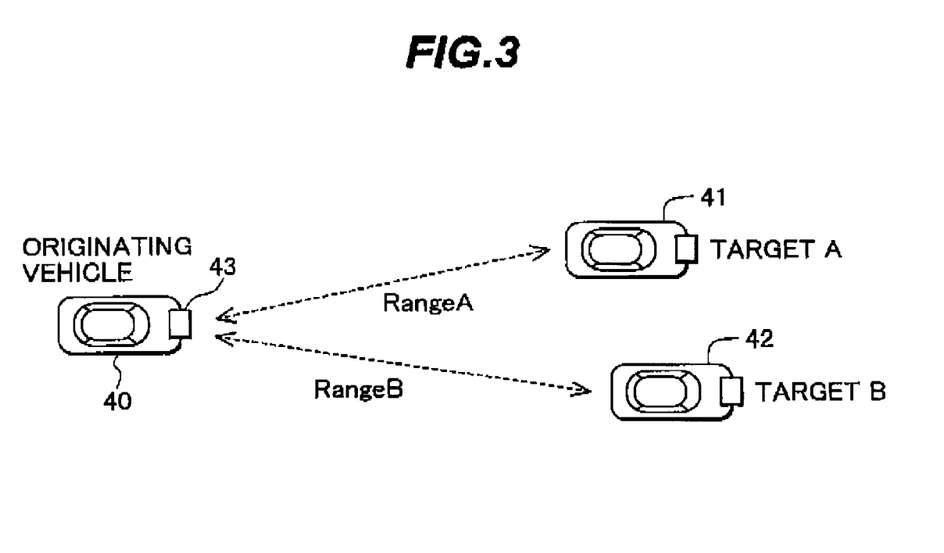
FIG. 3 is a diagram illustrating an exemplary positional relationship between objects under measurement and the distance measuring apparatus.

Consider now that two targets A, B have similar relative speeds and different distances, as illustrated in FIG. 3. In this event, reflected waves from the targets A, B have substantially the same Doppler frequencies for the respective transmission frequencies. For this reason, the power spectrum at the Doppler frequency corresponding to the relative speed of the targets A, B presents a composite signal of the reflected waves from the two targets A, B.

Figure 4:
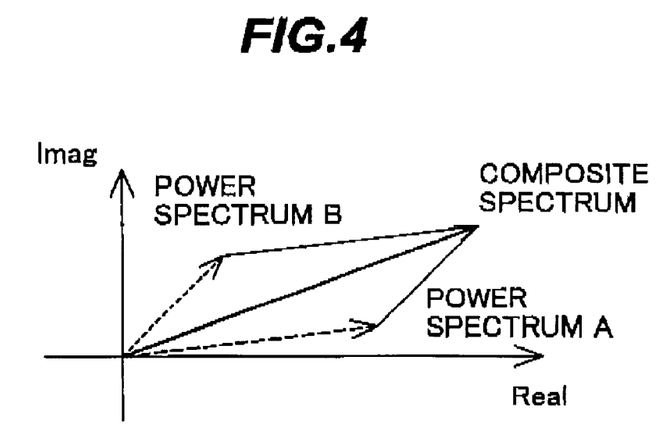
FIG. 4 is a diagram showing an exemplary power spectrum when a plurality of objects under measurement exist.

Specifically, a composite spectrum of the power spectrum A of the reflected wave from the target A and the power spectrum B from the target B is observed, as shown in FIG. 4.

Figure 5:
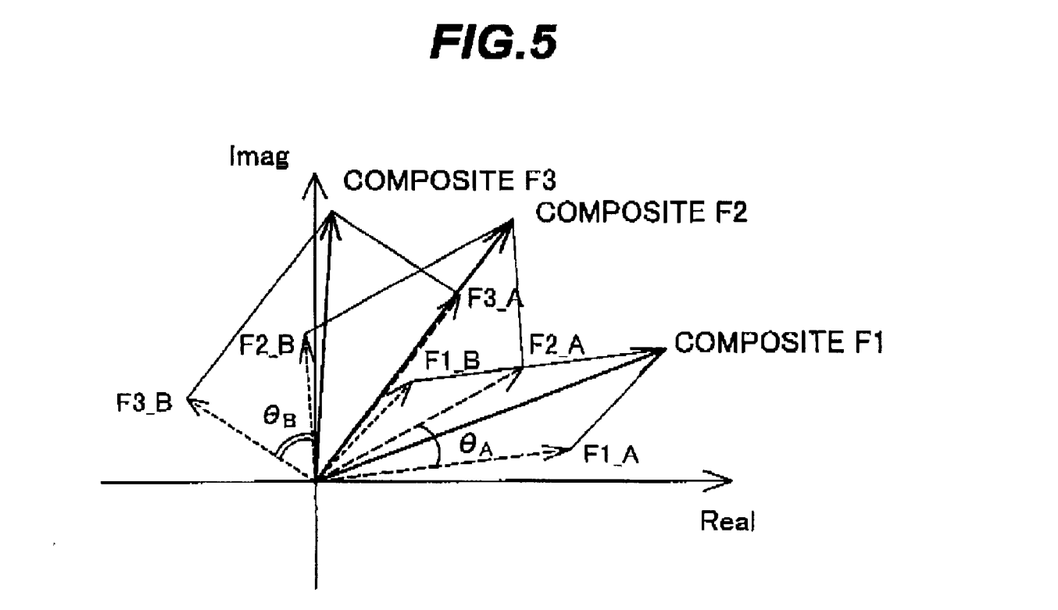
FIG. 5 is a diagram showing an exemplary frequency spectrum.

When the two targets A, B having similar relative speeds are measured by the distance measuring apparatus configured to switch the three transmission frequencies f1, f2, f3, shown in FIG. 2, information on the frequency spectra of the received signals presents a vector as represented in FIG. 5.

Specifically, observed are three vectors, composite F1, composite F2, composite F3, which are composite vectors of the reflected waves from the two targets A, B. These composite vectors are combinations of the reflected waves (F1__A, F2__A, F3__A) from the target A, and the reflected waves (F1__B, F2__B, F3__B) from the target B at the transmission frequencies f1–f3, which are combined at the respective transmission frequencies.

Here, as described in connection with the aforementioned Equation (1), when the difference $\Delta f$ of the transmission frequencies is constant, the phase difference of received signals for two transmission frequencies is proportional to the distance to the target A, so that the three vectors F1__A, if F2__A, F3__A have their respective phase angles to adjacent vectors substantially identical to $\theta A$ which is proportional to the distance Range A to the target A.

Likewise, for the target B, the three vectors F1__B, F2__B, F3__B have their respective phase angles to adjacent vectors substantially identical to $\theta B$ which is proportional to the distance Range B to the target B.

Representing the three composite vectors Composite F1, Composite F2, Composite F3 in complex Signal(1)–Signal(3), the power spectra of received signals are expressed by the following Equation (2), based on F1__A, F1__B:

$$ra = (4\pi \cdot RangeA)/c$$

$$rb = (4\pi \cdot RangeB)/c$$

$$\begin{pmatrix} Signal(1) \\ Signal(2) \\ Signal(3) \end{pmatrix} = \begin{pmatrix} 1 & 1 \\ \exp(j \cdot \Delta f \cdot ra) & \exp(j \cdot \Delta f \cdot rb) \\ \exp(j \cdot 2\Delta \cdot ra) & \exp(j \cdot 2\Delta f \cdot rb) \end{pmatrix} \begin{pmatrix} F1 = A \\ F1 = B \end{pmatrix} \quad (2)$$

The first and second rows of the Equation (2) are multiplied by $\exp(j \cdot \Delta f \cdot ra)$, and their upper and lower rows are subtracted from the products to derive the following Equation (3):

$$\exp(j \cdot \Delta f \cdot rb) = (Signal(2) \cdot \exp(j \cdot \Delta f \cdot ra) - Signal(3)) / (Signal(1) \cdot \exp(j \cdot \Delta f \cdot ra) - Signal(2)) \quad (3)$$

In the Equation (3), from the fact that the difference f between the respective transmission frequencies is known, and the absolute value of the right side is 1, $\exp(j \cdot \Delta f \cdot ra)$ can be calculated.

Also, $\exp(j \cdot \Delta f \cdot rb)$ can be calculated using the resulting $\exp(j \cdot \Delta f \cdot ra)$.

An exemplary solution to them is shown below.

First, $\exp(j \cdot \Delta f \cdot ra)$ is substituted as shown in the following Equation (4):

$$\exp(j \cdot \Delta f \cdot ra) = \cos(\Delta f \cdot ra) + j \cdot \sin(\Delta f \cdot ra) =$$

$$(1 - \tan^2(\Delta f \cdot ra/2))/(1 + \tan^2(\Delta f \cdot ra/2)) + j \cdot 2\tan(\Delta f \cdot ra/2)/(1 + \tan^2(\Delta f \cdot ra/2)) = (1-x^2)/(1+x^2) + j \cdot 2x/(1+x^2) \quad (4)$$

where $x = \tan(\Delta f \cdot ra/2)$

Next, since Signal(1), Signal(2), Signal(3) have known values, ra is calculated from the condition expressed by the following Equation (5) as a simultaneous equation for x:

$$\left| \frac{(Signal(2) \cdot \exp(j \cdot \Delta f \cdot ra) - Signal(3))}{(Signal(1) \cdot \exp(j \cdot \Delta f \cdot ra) - Signal(2))} \right| = 1 \quad (5)$$

$$x = (-2\gamma \pm (4\gamma^2 - (\alpha - 2\beta)(\alpha + \beta)))/(\alpha + 2\beta)$$

where $\alpha = -|Signal(1)|^2 + |Signal(3)|^2$
$\beta = Re(Signal(1) \cdot Signal(2)^* - Signal(2) \cdot Signal(3)^*)$
$\gamma = -Im(Signal(1) \cdot Signal(2)^* - Signal(2) \cdot Signal(3)^*)$ Also, Signal(1), Signal(2), Signal(3) are composite vectors (composite numbers) to be measured, and * indicates complex conjugates.

Using the values calculated by the foregoing equations, the distance Range A to the target A, and the distance Range B to the target B are calculated by the following Equation (6):

$$ra = (2/\Delta f)\tan^{-1}(x)$$

$$RangeA = (2 \cdot c/(4\pi \cdot \Delta f))\tan^{-1}(x)$$

$$RangeB = \left( c/(4\pi \cdot \Delta f) \right) \arg\left( \frac{(Signal(2) \cdot \exp(j \cdot \Delta f \cdot ra) - Signal(3))}{(Signal(1) \cdot \exp(j \cdot \Delta f \cdot ra) - Signal(2))} \right) \quad (6)$$

A processing flow for calculating the distances to the targets in the method of transmitting the foregoing three frequencies f1, f2, f3 will be described with reference to FIG. 6.

Figure 6:
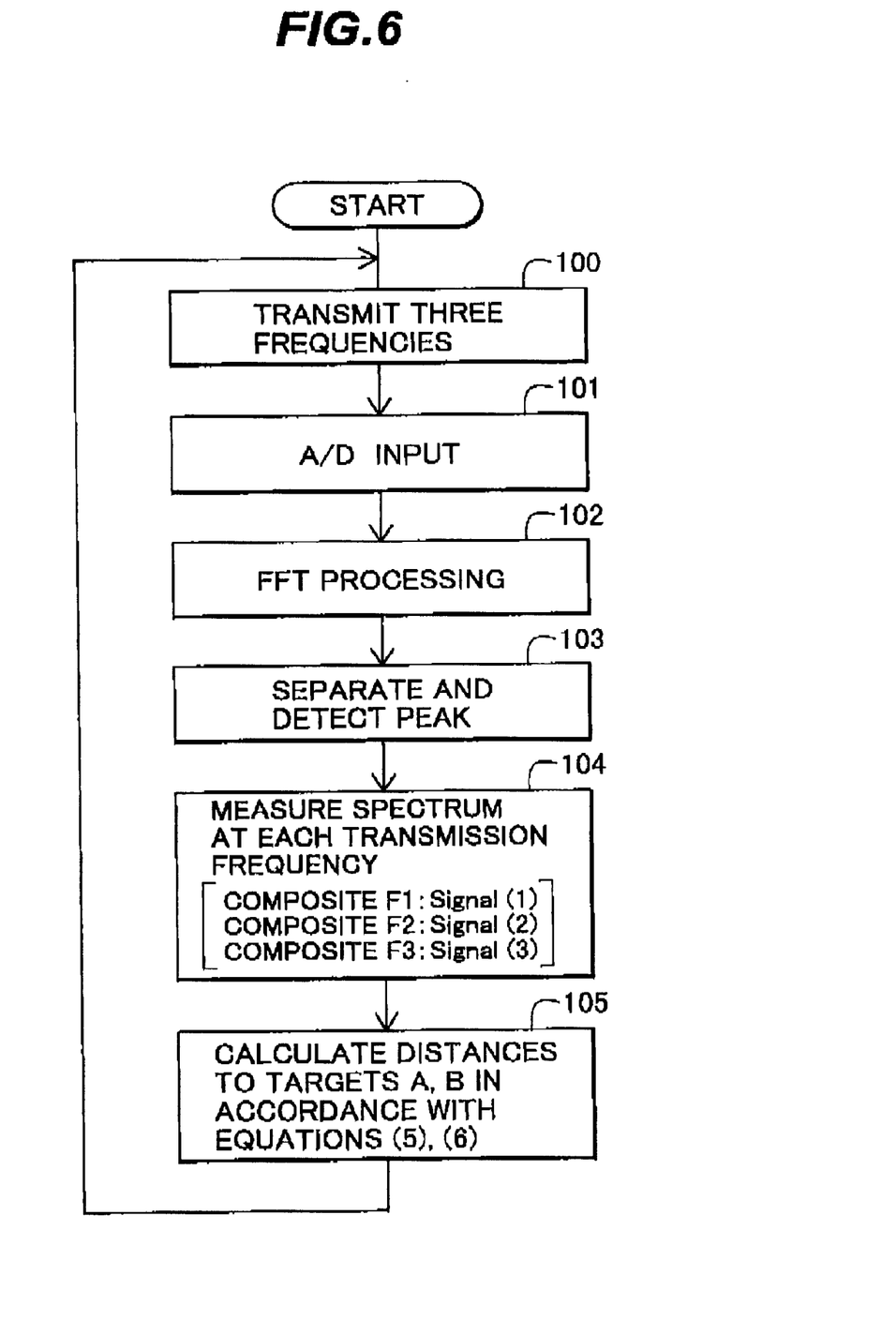
FIG. 6 is a processing flow chart for calculating the distance to an object under measurement in a method of transmitting three frequencies.

At step 100 in FIG. 6, the three transmission frequencies f1, f2, f3 are alternately transmitted over time at timings as indicated in FIG. 2. The switching of these transmission frequencies f1, f2, f3 is implemented by a modulated signal 19 sent from the modulator 17 to the oscillator 18 shown in FIG. 1.

At next step 101, a received signal reflected by a target is converted to a digital signal by the A/D converter 14. At this step 101, the sampling by the A/D converter 14 is performed a number of times equal to or larger than the number of sample points which are to undergo the FFT processing for each transmission frequency.

For example, when the number of sample points subjected to the FFT processing is N points which are sampled one by one in a transmission time $\Delta t$ of each frequency shown in FIG. 2, a time $(3 \times N \times \Delta t)$ is required for sampling all of the three frequencies f1, f2, f3.

Next, at step 102, the A/D inputted received signal is FFT processed by the FFT unit 15. This results in information on the frequency spectra of received signals at the three transmission frequencies f1, f2, f3.

Next, at step 103, peak values are separated and detected from the information on the frequency spectra. In the radar system utilizing the Doppler frequency such as the two-frequency CW method, the frequency of a peak value is proportional to a relative speed, so that targets having different relative speeds are separated to detect respective peaks.

Next, at step 104, the spectrum information with relative speeds having the same peak value is measured for each of the transmission frequencies f1, f2, f3.

Next, at step 105, the distances to the two targets A, B, which are substantially equal in relative speed to each (other, are calculated using Equation (5), Equation (6).

In the sequence of processing illustrated in FIG. 6. the processing after the separation and detection of the peaks at step 103 to step 105 is executed by the signal processing unit 16 in FIG. 1.

The processing from the foregoing step 100 to step 105 is repeated to measure the distance, and calculate the distances between the two targets A, B, which are substantially equal in relative speed to each other, and a reference vehicle (observer).

In the foregoing manner, according to the first embodiment of the present invention, it is possible to realize a distance measuring apparatus which has a function of separating and detecting a plurality of targets with substantially equal relative speeds to the observer, and measuring the relative speeds, and the distance between each of the plurality of targets and the observer.

Next, a second embodiment of the present invention will be described with reference to FIG. 7.

The first embodiment described with reference to FIGS. 1 through 6 is a method which involves switching three transmission frequencies f1, f2, f3 in order, separating and detecting two targets A, B, and calculating their relative speeds and distances. As is apparent from the measurement principles, in the method according to the present invention, an increase in the number of steps of transmitted frequencies results in a like increase in the amount of information on frequency spectra which can be measured. (N−1) targets can be separated and detected by utilizing the amount of information on frequency spectra under measurement, and providing N transmission frequencies.

Figure 7:
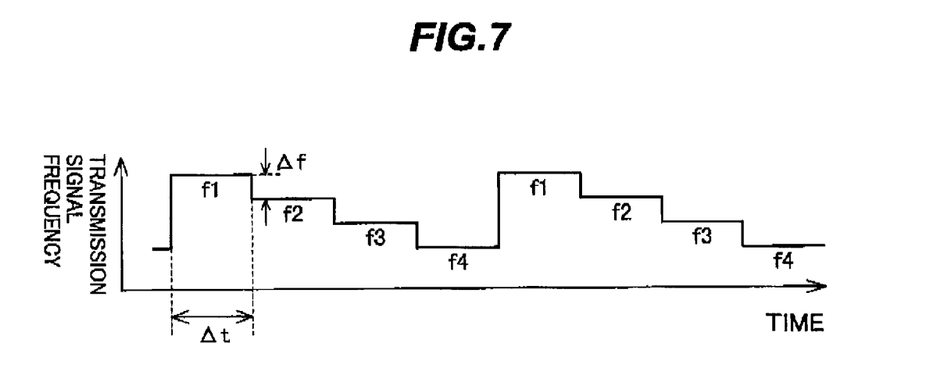
FIG. 7 is a diagram showing a change in a transmission signal frequency over time in a second embodiment of the present invention.

Therefore, the second embodiment provides a method of sequentially switching four transmission frequencies f1, f2, f3, f4 over time, as shown in FIG. 7. Then, the frequency f2 is lower in frequency by Δf than f1, and the frequency f3 is lower in frequency by Δf than f2. Also, the frequency f4 is lower in frequency by Δf than f3. A transmission time at each frequency lasts for Δt which is equal to each other.

In this manner, by providing four transmission frequencies f1, f2, f3, f4, and using a distance measuring apparatus similar to the distance measuring apparatus illustrated in FIG. 1, i.e., in a manner similar to the first embodiment, relative speeds of three targets and the distances between the respective targets and the observer can be calculated in accordance with the flow chart illustrated in FIG. 6 (however, the measurements of spectra and the like are made four times in conformity to the types of frequencies).

Therefore, according to the second embodiment, it is possible to realize a distance measuring apparatus which has a function of separating and detecting a plurality of or three targets with substantially equal relative speeds to the observer, and measuring their relative speeds and the distance between each of the targets and the observer.

Moreover, it is contemplated to provide a method of transmitting five or more transmission frequencies in alternation to separate and detect a plurality of targets.

Next, a third embodiment of the present invention will be described with reference to FIGS. 8 and 9.

As described in connection with the first embodiment, since the sampling by the A/D converter 14 is performed a number of sample points, which undergo the FFT processing, or more, a total of time (2×N×Δt) is required f or sampling data which undergo the FFT processing when two frequencies are transmitted. Likewise, for transmitting three frequencies, a time (3×N×Δt) is required for sampling data which undergo the FFT processing.

Generally, since the distance measuring apparatus desirably detects targets, if any, in an early stage, the time required for sampling data for the FFT processing should be as short as possible.

To meet this requirement, with a strategy which normally measures a distance at two alternating frequencies in accordance with the two-frequency CW method and switches at a certain timing to a method which additionally transmits a third frequency, it is possible to use, as required, the two-frequency CW method which only requires a short processing time, and a three-frequency based method which, though requiring a processing time not shorter than the two-frequency CW method, is capable of separating and measuring a plurality of targets which have substantially the same relative speeds.

Figure 8:
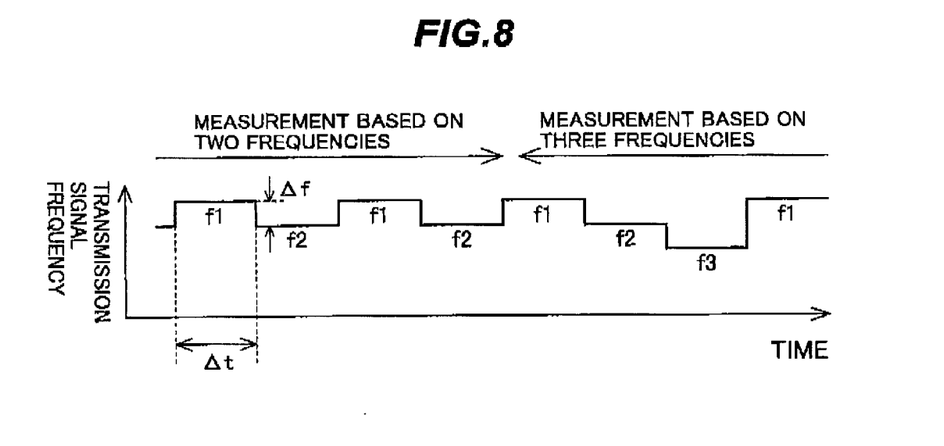
FIG. 8 is a diagram showing a change in a transmission signal frequency over time in a third embodiment of the present invention.
Figure 9:
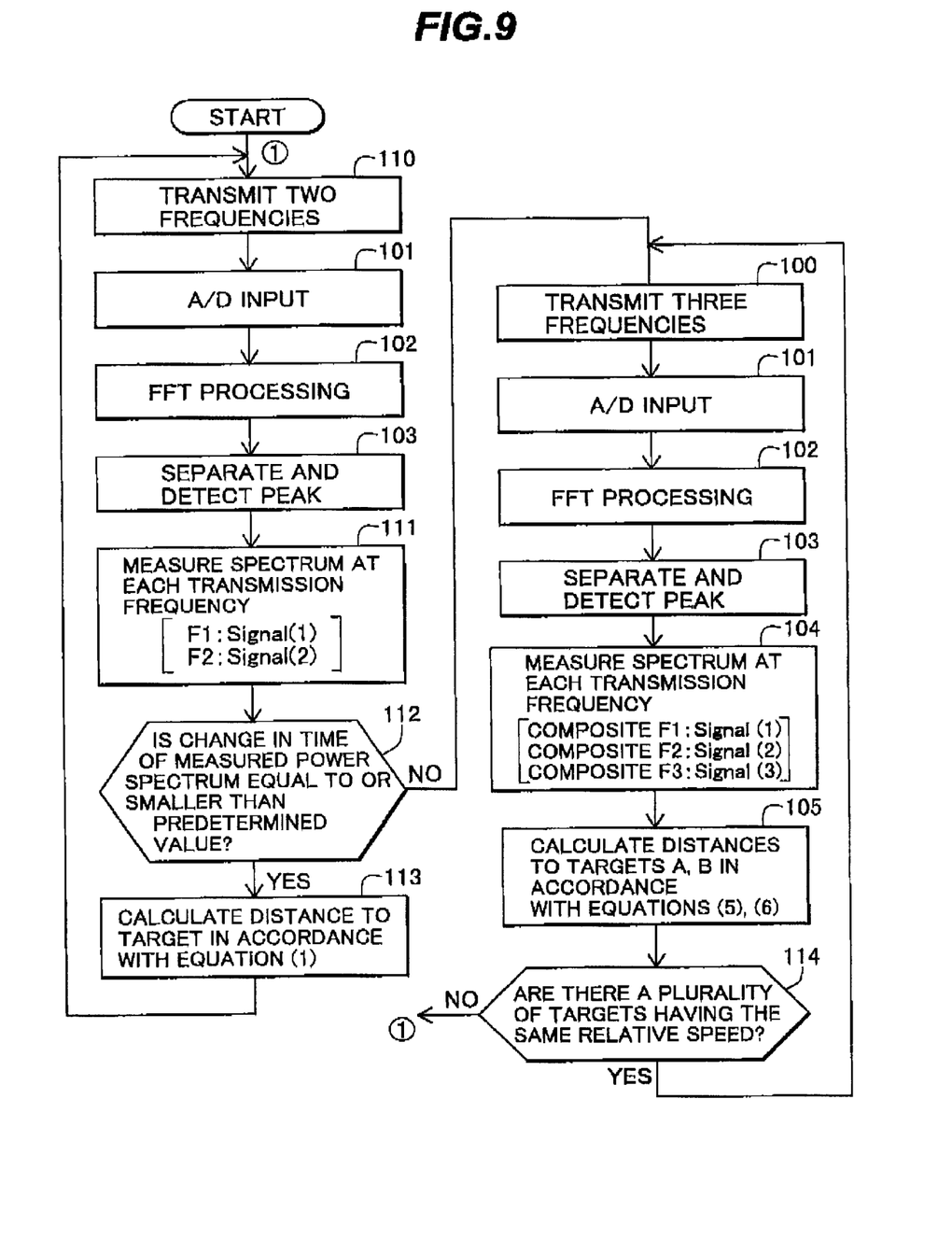
FIG. 9 is a processing flow chart for calculating the distance to an object under measurement in the third embodiment.

For the implementation which involves switching the two-frequency CW method and the three-frequency based method, signal transmission timings are shown in FIG. 8, and a processing flow is illustrated in FIG. 9.

As illustrated in FIG. 8, generally, the two-frequency CW method is relied on to measure distances at two alternating frequencies f1, f2, and a third frequency f3 is also added at a certain timing to transmit the frequencies f1, f2, f3 which are switched in sequence.

In a first time region in which the two frequencies f1, f2 are transmitted, the conventional two-frequency CW method is used to measure distances. In a second time region in which the third frequency is additionally transmitted, information on the three measured frequencies is utilized to separate and measure a plurality of targets having substantially the same relative speeds.

For the timing at which the transmission of the two frequencies f1, f2 is switched to the transmission of the three frequencies f1, f2, f3, a temporal change in the power spectrum of a measured peak, for example, may be checked to see whether it is equal to or larger than a predetermined value.

When a plurality of targets having the same relative speed exist, a measured frequency spectrum appears to be a signal which is a combination of reflected waves from the plurality of targets, as shown in FIG. 4.

A reflected wave from each target varies in amplitude over time due to the influence of multipath or the like, so that the measured composite spectrum largely varies in amplitude and phase over time. FIG. 9 illustrates a processing flow for switching a time region in which the two frequencies f1, f2 are transmitted and a time region in which the three frequencies f1, f2, f3 are transmitted, making use of the foregoing characteristics.

In FIG. 9, generally, the two frequencies f1, f2 are alternately transmitted at step 110. While the processing from step 101 to step 103 is similar to the processing described in the flow chart of FIG. 6, a time required for sampling the number of points subjected to the FFT processing is (2×N×Δt) since measurements are made at the two frequencies in this time region.

Next, at step 111, the power spectra of received signals are measured at the respective transmission frequencies f1, f2. Subsequently, at step 112, it is determined whether or not the amounts of variations in the amplitude and phase of the measured power spectra over time are equal to or larger than predetermined values. As the predetermined values in this determination, for example, if the amounts of variations in the amplitude and phase over time are equal to or larger than 30%, the amounts of variations over time may be determined as large.

When it is determined at step 112 that variations in the measured power spectra over time are equal to or smaller than the predetermined values, the flow proceeds to step 113, where the distances to the targets are calculated using Equation (1), followed by a repetition of measurements of distances using the two frequencies f1, f2 from step 110.

When the amounts of variations in the amplitude and phase of the measured power spectra over time are equal to or larger than the predetermined values, the flow proceeds to step 100, where the three frequencies f1, f2, f3 are alternately transmitted at timings as indicated in the time region of the three-frequency based measurement in FIG. 8.

Next, similar to the processing described in the flow chart of FIG. 6, the processing from step 101 to step 105 is performed to measure the distances to the two targets A, B. In this event, since the three frequencies f1, f2, f3 are being alternately transmitted, a time required for sampling the number of points subjected to the FFT processing amounts to (3×N×Δt).

Next, it is determined at step 114 whether or not there are a plurality of targets which have the same speed. When there are a plurality of targets having the same relative speed, the flow returns to step 100, where the processing for transmitting the three frequencies f1, f2, f3 is continued.

When it is determined at step 114 that there are not a plurality of targets having the same relative speed, the flow returns to step 110, where the two-frequency based measurement is performed by transmitting the two frequencies f1, f2.

By thus providing the time region in which the two frequencies f1, f2 are transmitted, and the time region in which the three frequencies f1, f2, f3 are transmitted, the existence of targets can be normally measured in a short time of (2×N×Δt), and when a plurality of targets can exist, the respective distances to the plurality of targets can be measured by using the three frequencies f1, f2, f3.

In the foregoing manner, according to the third embodiment of the present invention, in addition to the ability to provide similar effects to those of the first embodiment, it is possible to realize a distance measuring apparatus which can use, as required, the two-frequency CW method that requires a shorter processing time, and the three-frequency based method that, though a longer processing time is required than the two-frequency CW method, is capable of separating and measuring a plurality of targets which have substantially the same relative speeds.

As previously shown in the foregoing embodiment, the switching of the number of transmitted frequencies at a certain timing may be applied, for example, to switching from the transmission of the two frequencies f1, f2 to the transmission of N frequencies, where N is four or more.

Figure 10:
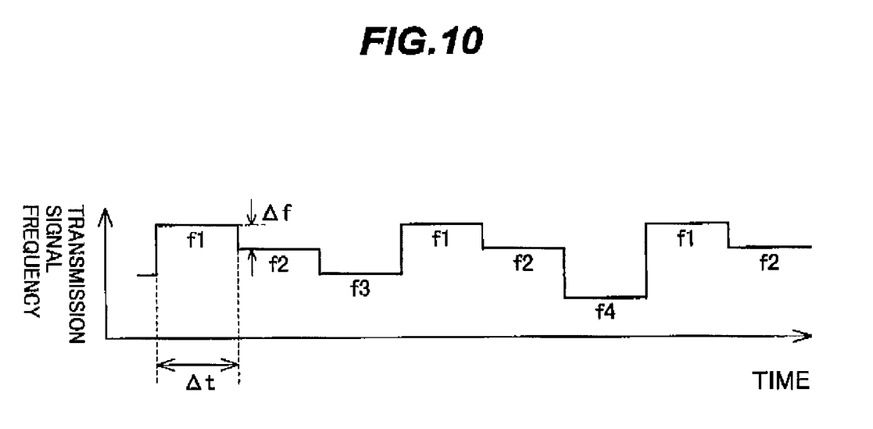
FIG. 10 is a diagram showing another example of a change in a transmission signal frequency over time.

Also, as shown in FIG. 10, the third frequency f3 and fourth frequency f4 are alternately transmitted within a certain time period. Specifically, even when the frequencies are alternated such as f1→f2→f3→f1→f2→f4, three targets can be separately measured, making use of information on the four measured frequencies f1, f2, f3, f4, as described in the foregoing embodiment.

In the embodiment of FIG. 10, a time required for sampling the number of points subjected to the FFT processing amounts to (3×N×Δt) for the two transmission frequencies f1, f2, while a time required for sampling the number of points subjected to the FFT processing amounts to (6×N×Δt) for the transmission frequencies f3, f4.

While in the foregoing example, a single transmitter is provided for transmitting a plurality of frequencies, a plurality of transmitters may be provided to transmit a plurality of frequencies from the plurality of transmitters. However, when a plurality of transmitters are provided, the frequencies must be adjusted among the plurality of transmitters, and the weight is increased. On the other hand, when a single transmitter is provided alone such that a plurality of frequencies are transmitted from the signal transmitter, no adjustment is required for the frequencies among a plurality of transmitters, and the weight is reduced.

The time Δt for which one frequency signal is continued should be equal to or longer than a time taken for a radio wave to go and return the distance to a target.

Also, while the foregoing example is an example in which the present invention is applied to a distance measuring apparatus for an automotive vehicle, the present invention is not limited to a use for automotive vehicle but may be applied to other distance measuring apparatus.

For example, the present invention can be applied to a system which comprises a distance measuring apparatus installed near a road to determine a speed of a running vehicle, and vehicles which are running at that speed.

Also, the present invention can be applied to a system which comprises a distance measuring apparatus installed near a blind road to notify how many automotive vehicles are approaching a curve at which speeds.

The present invention can also be applied to an apparatus for detecting objects under measurement, which recognizes a plurality of objects under measurement. Specifically, the present invention can also be applied, for example, to an apparatus for detecting objects under measurement, which separates and recognizes the positions of a plurality of pedestrians going ahead or the like, and displays them in a vehicle, when the vehicle is being driven at night. In this case, a means for separating and detecting the respective positions of a plurality of pedestrians or the like is the signal processing unit 16.

INDUSTRIAL AVAILABILITY

According to the present invention, by providing a first separating/detecting means having a function of transmitting a certain constant first frequency for a predetermined time or more, transmitting a second frequency having a certain frequency difference from the first frequency for a predetermined time or more, and transmitting an nth frequency having a frequency difference of an integer multiple equal to or larger than two of the frequency difference from the first frequency for a predetermined time or more, and for measuring the Doppler frequencies of reflected waves from objects under measurement at the respective transmission frequencies to separate and detect the objects under measurement at each Doppler frequency, and a second separating/detecting means for separating objects under measurement having the same Doppler frequency from phase information and amplitude information of received signals acquired at each transmission frequency, it is possible to realize a distance measuring apparatus which is capable of separating and detecting a plurality of objects under measurement having substantially the same relative speeds, and calculating the distance between each of the plurality of objects under measurement and an observer.

Also, by virtue of the ability to separate and detect a plurality of objects under measurement having substantially the same relative speeds, it is possible to realize an apparatus for detecting objects under measurement, which is capable of separating each of a plurality of pedestrians or the like, which are moving at the same relative speed, and recognizing their existence at night or the like.

What is claimed is:

1. A distance measuring apparatus which radiates a radio wave, receives a reflected wave from an object under measurement, and detects the object under measurement, said distance measuring apparatus comprising:

transmitting means for transmitting a first frequency signal and a second frequency signal having a predetermined frequency difference from the frequency of the first frequency signal during a first time period, and transmitting said first frequency signal, said second frequency signal and N frequency signals having a frequency difference equal to an integral multiple of at least twice said predetermined frequency difference during a second time period, where N is an integer at least equal to one, and said first time region is shorter than said second time region;

receiving means for measuring a Doppler frequency of the reflected wave from said object under measurement at each of the respective transmission frequencies of said first frequency signal, second frequency signal, and said N frequency signals; and detection processing means for separating a plurality of objects under measurement to detect said object under measurement.

2. A distance measuring apparatus according to claim 1, wherein N is one.

3. A distance measuring apparatus according to claim 2, wherein said transmitting means has a single transmitter, and a plurality of frequencies are periodically alternately transmitted by the single oscillator.

4. A distance measuring apparatus according to claim 1, wherein:

said detection processing means has a first separation/detection function for separating and detecting an object under measurement at each Doppler frequency of received signals, and a second separation/detection function for measuring phase information and amplitude information on received Doppler frequencies, and separating and detecting a plurality of objects under measurement having substantially the same Doppler frequencies from the phase information and amplitude information.

5. A distance measuring apparatus according to claim 4, wherein said transmitting means has a single transmitter, and a plurality of frequencies are periodically alternately transmitted by the single oscillator.

6. A distance measuring apparatus according to claim 1, wherein: and said transmitting means has a single transmitter;

a plurality of frequencies are periodically alternately transmitted by the single oscillator.

7. A distance measuring apparatus which radiates a radio wave, receives a reflected wave from an object under measurement, and detects the object under measurement, said distance measuring apparatus comprising:

transmitting means for continuously transmitting a first frequency signal for a predetermined time or more, continuously transmitting a second frequency signal having a predetermined frequency difference from the first frequency for a predetermined time or more, and transmitting a signal having a frequency difference of an integer multiple equal to or larger than twice said predetermined frequency difference from the first frequency over signals at N frequencies, where N is an integer equal to or larger than one, said means having a first time region in which said first frequency signal and said second frequency signal are alternately transmitted over time, and a second time region in which said first frequency signal through an (N+2)th frequency signal are respectively transmitted alternately over time;

receiving means for measuring a Doppler frequency of the reflected wave from said object under measurement at each of the respective transmission frequencies of said first frequency, second frequency, and N frequencies; and detection processing means for separating a plurality of objects under measurement to detect said object under measurement.

* * * * *